United States Patent

Soldner

[15] 3,693,414
[45] Sept. 26, 1972

[54] ULTRASONIC IMAGE PRODUCING INSTRUMENT

[72] Inventor: Richard Ernest Soldner, Erlangen, Germany

[73] Assignee: Siemens Aktiengesellschaft, Rulangen, Germany

[22] Filed: May 8, 1970

[21] Appl. No.: 35,740

[30] Foreign Application Priority Data

June 4, 1969 Germany..........P 19 28 367.1

[52] U.S. Cl....................................73/67.9, 73/67.8
[51] Int. Cl.............................................G01n 29/04
[58] Field of Search..............................73/67.8, 67.9

[56] References Cited

UNITED STATES PATENTS

| | | | |
|---|---|---|---|
| 3,159,023 | 12/1964 | Steinbrecher | 73/67.8 |
| 3,470,868 | 10/1969 | Krause et al. | 73/67.8 UX |
| 3,480,002 | 11/1969 | Flaherty et al. | 73/67.9 UX |

OTHER PUBLICATIONS

A New Concept in Immersion Ultrasonics A. P. Rogel et al., Materials Evaluation, May 1968, p. 83–89

*Primary Examiner*—Richard C. Queisser
*Assistant Examiner*—John P. Beauchamp
*Attorney*—Richards & Geier

[57] ABSTRACT

An ultrasonic image producing instrument of the impulse echo type is used for making visible sections of an object being examined, particularly inner organs in the body of a patient. The instrument has an ultrasonic emitting and receiving system, the emitter of which sends an ultrasonic ray into the object being examined and the receiver of which receives echo impulses reflected from various limiting surfaces of the object. The instrument also has drives for shifting the system relatively to the object being examined, namely, by shifting the ultrasonic ray line by line selectively in one plane or in a plane perpendicular thereto while the ray direction always remains the same. The instrument also has an oscillograph tube having an electron ray which is deviated by a vertical sweep generator synchronized with the ultrasonic emitter in a vertical direction with a speed proportional to the duration of the emitted impulse in the object being examined and deviated by a horizontal sweep generator capable of being synchronized with the drives in the horizontal direction with a speed proportional to the shifting speed of the ultrasonic ray in the respective plane, the deviation taking place over the image screen of the tube, which lights and measures the echo impulses transmitted by the receiver to the Wehnelt cylinder of the tube.

2 Claims, 5 Drawing Figures

INVENTOR:
R. Soldner

ULTRASONIC IMAGE PRODUCING INSTRUMENT

This invention relates to an ultrasonic image producing instrument operating according to the impulse echo process and particularly useful for medical diagnosis by making visible sections of a part being examined, particularly organs inside the body of a patient. The echo impulses become visible by the use of an image tube.

The instrument has an ultrasonic emitting and receiving system the emitter of which produces an ultrasonic ray which can be shifted line by line in a sectional plane of the object to be examined, as well as an image indicating device consisting of an oscillograph tube having two sweep generators for deviating the electron beam of the tube over the screen in one direction with a speed proportional to the travel speed of an emitted impulse in said object and in a direction perpendicular thereto with a speed proportional to the shifting speed of the ultrasonic ray in the plane; the electron beam of the tube is modulated in its intensity by the received ultrasonic echo impulses.

By way of example, in such an instrument the ultrasonic emitting and receiving system for emitting and receiving ultrasonic impulses is located in the focal line of a cylindrical parabolic reflector and is rotatable about the focal line as axis.

A sectional image of the object being investigated, such as an organ inside the body, is produced by rotating the ultrasonic emitter which sends an ultrasonic ray in the direction of the reflector and by using the ray which is reflected continuously parallel to itself due to the rotation of the emitter and the reflecting properties of the reflector, to likewise feel out a sectional plane of the object being investigated.

Then a line in a sectional plane appears as a track of an ultrasonic emitted impulse in a point of the surface of the object being investigated.

Sectional images which are thus produced provide information upon the location of limiting surfaces of the object in a single plane (sectional plane). The term "limiting surfaces of an object" is used to describe those layers of an object wherein media of different thicknesses engage each other, so that reflections can take place for that reason. By way of example, the outer surface (front or rear surface) of the object being examined may be considered as such layer.

However, knowledge about one sectional plane is not sufficient to provide information about the shape and the size of the object, since then there is no information about the extension of the object perpendicularly to that plane.

Up to now this information could be obtained by this instrument either by slowly shifting the ultrasonic emitting and receiving system during the investigation of a plane perpendicularly to that plane, whereby one after another sectional planes are represented which are parallel to each other and whereby changes in the outlines of the object being examined during the shifting of the planes provide information about the extension of the object in space; the whole reflector together with the ultrasonic emitting and receiving system is turned by 90° on the surface of the object to be examined, around an axis perpendicular to said surface.

Both procedures have drawbacks.

The substantial drawback of the first procedure is that it is not possible to measure directly the space extension of the object perpendicularly to a plane, but it can be only estimated; however, the observed change of the outlines of the object during the shifting of the planes provides always only a vague conclusion about the spacial measurements.

In the case of the second procedure, namely, when rotating the reflector, the information obtained can be measured directly, but there is the drawback that the required raising of the reflector from the surface of the body and the subsequent placing upon the same part of the body of the reflector turned to the extent of 90°, consumes time and cannot be carried out with sufficient precision, particularly when soft tissues are being investigated, since the tissue can move away when the applicator is applied in a manner which cannot be controlled. Thus this investigating method does not produce sufficiently quickly information about the third dimension and particularly, it does not provide a useable relative arrangement of the different sectional planes.

An object of the present invention is to eliminate these drawbacks in their entirety.

A specific object is to obtain sectional planes perpendicular to the known sectional plane in a simple manner and without changing the placing of the applicator and thereby produce quickly and easily precise measurable information concerning the extension in space of the object being examined.

Other objects will become apparent in the course of the following specification.

In the accomplishment of the objectives of the present invention it was found desirable to provide drives for the ultrasonic system which guide the ultrasonic ray selectively over said plane or a plane perpendicular thereto, whereby the image generator can be so synchronized with the drives that the shifting of the lines upon the image showing device takes place corresponding to the speed of shifting of the ray in the respective plane.

An advantageous embodiment of the present invention consists in providing each drive with quick motion as well as slow motion, and making it possible to combine the slow motion of one drive additionally with the quick motion of the other drive.

This makes it possible to cause the ultrasonic ray to engage selectively and without changing the connection one after the other and line after line the planes of one of two series of parallel planes extending perpendicularly to each other, whereby then the change in outlines of the object being investigated can be observed selectively in one viewing direction or in a direction perpendicular thereto; thus the impression of the image in space is greatly improved for the observer.

It is advantageous to arrange the slow motion so that it can be switched on and off at short intervals, since then the plane covered by the ultrasonic ray in quick motion can be shifted in parallel step by step; it is thus possible in a simple manner and without changing the coupling to select any desired plane from the two plane series, to engage it and to measure it.

According to a further embodiment of the present invention additional sectional planes extending perpendicularly to either one or the other plane are produced by causing the ultrasonic ray to engage selectively linewise and one after the other planes parallel to one of the planes, a gate switch being provided which allows the passage to the image producing device of echo impulses from only one adjustable depth range. Furthermore, instead of the line generator a deviating generator operated in synchronism is provided for the drive causing the parallel shifting of the plane, which can be switched on additionally for improving the image.

This provides the possibility of representing the object being examined corresponding to the locations of planes of a spacial rectangular coordinates system without changing the coupling.

The invention will appear more clearly from the following detailed description when taken in connection with the accompanying drawings showing by way of example only, a preferred embodiment of the inventive idea.

IN THE DRAWINGS

Figure 1:
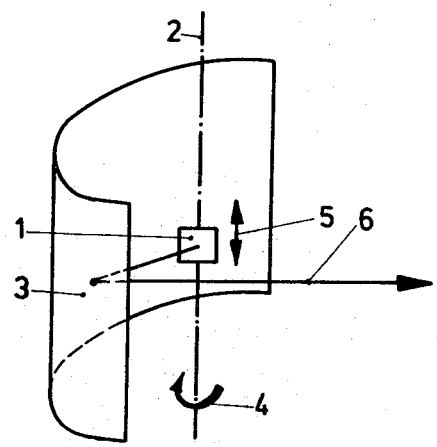
FIG. 1 is a diagram illustrating the arrangement of an ultrasonic emitting and receiving system in a reflector for shifting the ultrasonic ray produced by the ultrasonic emitter.

FIG. 1 shows an ultrasonic emitting and receiving system 1 located in the focal line 2 of a cylindrical parabolic reflector 3. The system 1 is rotatable about the focal line 2 as its axis, as indicated by the arrow 4 and is also movable up and down in the directions indicated by the double arrow 5. The ultrasonic ray 6 which is directed to the reflector 3 and is then reflected, is used to investigate a plane.

Figure 2:
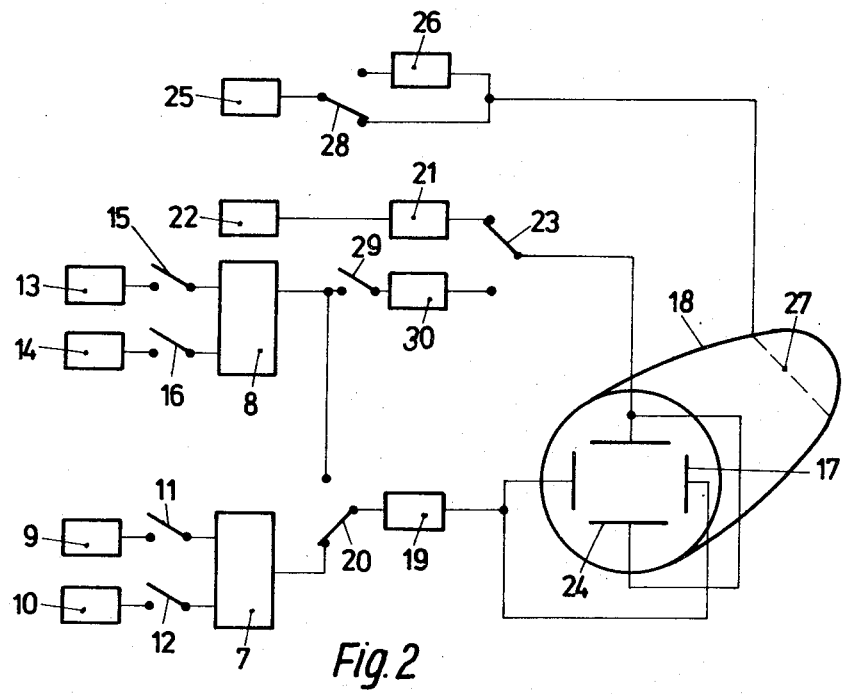
FIG. 2 is a circuit diagram of the device of the present invention.

In FIG. 2, 7 is the drive for the rotary movement of the system 1 and 8 is the drive for its longitudinal movement. A quick motion device 9 for improving the picture and a slow motion device 10 for locating the desired plane are attached to the drive 7. The motion devices 9 and 10 vary independently of each other through switches 11 and 12, respectively, the speed of the drive 7. The drive 8 is correspondingly provided with a quick motion device 13, a slow motion device 14 and switches 15 and 16. A horizontal sweep deviating generator 19 (image generator) is connected with a pair of horizontal plates 17 of the oscillograph tube 18 and can be connected by the switch 20 either with the drive 7 or with the drive 8. The generator 19 is so synchronized with the drive to which it it connected, that its outlet voltage periodically deviates the electron ray of the tube 18 in the horizontal direction corresponding to the deviating speed of the ultra-speed ray 6.

The vertical sweep deviating generator 21 (line generator) is operated by the ultrasonic emitter 22 of the emitting-receiving system 1 and it produces a tipping voltage corresponding to the duration of the ultrasonic emitted impulses in the object to be examined. The generator 21 can be connected by the switch 23 with the vertical plate pair 24 of the tube 18. The receiver 25 can be connected with the beam intensity control grid 27 of the tube 18 either directly or through an electronic gate device 26; here connections take place at will by a switch 28.

The connection between the generator 21 and the vertical pair of plates 24 can be broken off by means of the switch 23 and then the generator 21 is replaced by the deviating generator 30 which can be connected by the switch 29 with the drive 8 and which is then connected to the vertical pair of plates 24.

Figure 3:
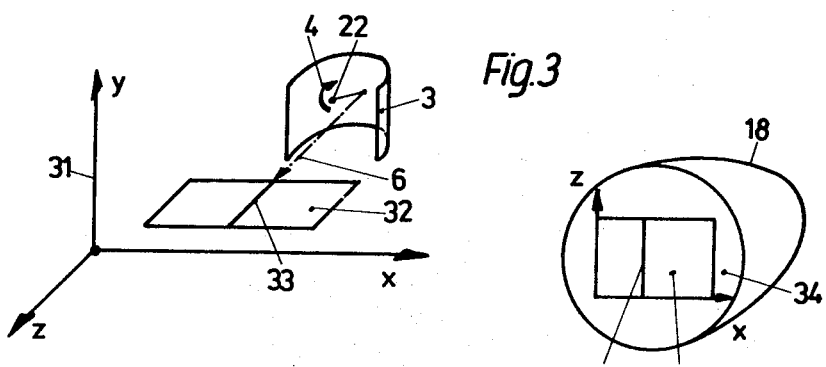
FIGS. 3, 4 and 5 are diagrams showing separately three planes which are perpendicular to each other in a spacial coordinates system and their representations upon a light screen of an oscillograph tube.
Figure 4:
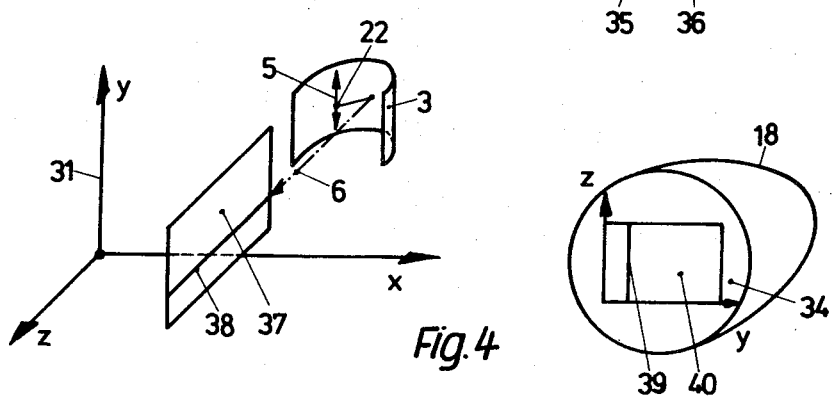
Figure 5:
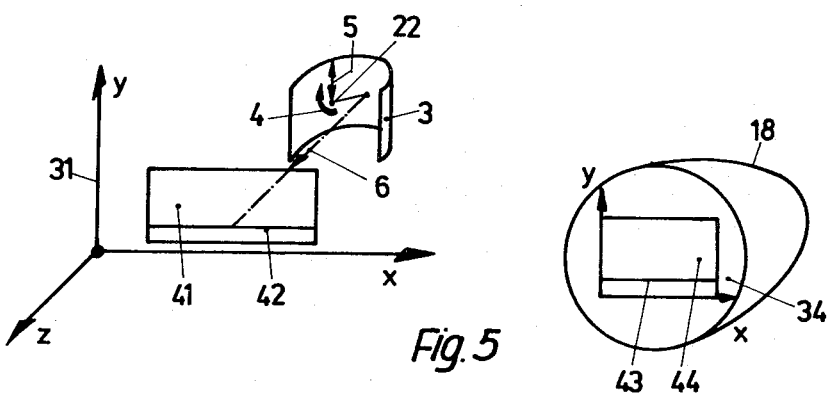

The operation of the device will now be explained on the ground of FIG. 2 and also FIGS. 3–5 showing a sectional plane engaged by the ultrasonic ray and its representation upon the screen of the oscillograph tube.

FIG. 3 shows a spacial system of coordinates $x$, $y$, $z$, designated by the numeral 31 and a sectional plane 32 parallel to the plane $x$, $z$, which must be examined line by line by the ultrasonic ray 6 extending parallel to the z-axis into the plane 32. As shown in FIG. 2, this is carried out by closing the switch 11 while other switches remain in the illustrated positions. Then the drive 7 actuated by the quick motion device 9 will impart quick rotation to the ultrasonic emitting and receiving system 1.

The optical visibility of the sectional plane 32 which has thus been examined is attained in that the echo impulses from the different depths of a line 33 of the sectional plane 32, which are received one after the other by the ultrasonic receiver 25, operate the grid 27 of the tube 18 in such manner that each echo impulse striking the screen 34 of the tube 18 is inscribed as light.

Voltage produced by the generator 21 and applied to the vertical plate pair 24, is so deviated vertically by the electron ray of the tube 18 that a line 35 is produced upon the screen 34 which corresponds to light points of echo impulse and to the line 33 of the sectional plane 32. Further creation of the picture takes place in that the voltage coming from the generator 19 and applied to the horizontal plate pair 17, shifts the line 35 horizontally upon the screen 34, so that its actual location in the sectional image 36 corresponds to the actual location of the line 33 in the sectional plane 32.

In addition to the switch 11, the switch 16 can be also closed with the result that the ultrasonic emitting and receiving system 1 will be simultaneously rotated and shifted slowly in the direction of the focal line 2. This makes possible to examine parallel planes one after the other. The switch 16 can be also switched on and off at short intervals with the result that the ultrasonic ray is guided stepwise into the desired sectional plane.

FIG. 4 shows the coordinates system 31 into which a sectional plane 37 has been introduced which extends parallel to the $y$, $z$ plane and consequently perpendicular to the sectional plane 32. The line-by-line examination of this plane is carried out by closing the switch 15, so that the system 1 is moved back and forth along the focal line 2. The testing of the plane 37 then takes place by a quick opening and closing of the switch 12.

In order to make the sectional plane 37 optically visible, the generator 19 is connected with the drive 8 by the switch 20, while the other switches remain in the position shown in FIG. 2.

The representation of the line 38 of the sectional plane 37 upon the screen 34 as the corresponding line 39 of the sectional image 40, takes place in the same manner as in the case of the sectional plane 32, only the image structure is now operated by the drive 8 through the generator 19.

By additionally switching on the switch 12 to the switch 15, again the possibility is provided to examine one after the other planes parallel to the sectional plane 37 and to represent them.

FIG. 5 shows a sectional plane 41 which extends parallel to the x, y plane of the coordinates system 31 and which, consequently, is perpendicular to the plane 32 and is also perpendicular to the plane 37. An examination of the plane 41 is carried out, firstly, by closing the switches 11 and 16 and, secondly, by connecting the receiver 25 through the switch 28 and the gate switch 26 with the grid 27 of the tube 18. The gate switch device 26 permits the passage to the tube 18 only of such echo impulses which are received from an adjustable depth range of the object being examined, while all others are suppressed. Echo impulses received one after the other during one-half of a rotation of the sender 22 from a constant depth range, will then form a line 42 of the sectional plane 41.

The optic visibility of the plane 41 is attained in that the generator 19 is connected by the switch 20 with the drive 7, the generator 30 is connected by the switch 29 with the drive 8 and by means of the switch 23 with the vertical pair of plates 24, whereby the generator 19 inscribes the line 42 of the sectional plane 41 as the line 43 of the sectional image 44 upon the screen 34. The shifting of the line 43 upon the screen 34 for the formation of a picture is caused by the generator 30 which is synchronously operated by the drive 8. Thus according to FIG. 3 the switch 11 is closed and the switch 16 can be closed. All other switches remain in the position shown in FIG. 2. According to FIG. 4 the switch 15 is closed, the switch 12 can be closed, while the switch 20 is in a reverse position from that shown in FIG. 2. All other switches remain in the position shown in FIG. 2. According to FIG. 5, the switches 11, 16 and 29 are closed, while the switches 23 and 28 are in reverse positions from those shown in FIG. 2. All other switches remain in the position shown in FIG. 2.

I claim:

1. An ultrasonic image producing instrument of the impulse echo type for making visible sections of an object being examined, comprising an ultrasonic emitting and receiving system having an emitter sending an ultrasonic ray into said object and a receiver receiving echo impulses reflected from various limiting surfaces of said object, first and second fast speed drives for shifting said system relatively to said object for moving the ultrasonic ray line by line selectively in a first plane or in a second plane perpendicular thereto and while the ray direction is not varied, first and second slow speed drives for shifting said system in a direction perpendicular to the first or second plane in order to change to a parallel plane, an oscillograph tube having an image screen and a beam intensity control grid connected with the receiver of the ultrasonic emitting and receiving system and emitting an electron beam which is modulated in its intensity by the echo impulses transmitted from the receiver to said beam intensity control grid, a vertical sweep generator connected to said emitter and deviating said electron ray vertically over said screen with a speed proportional to the travel speed of an emitted impulse in said object, and a horizontal sweep generator selectively connected to said first or second fast speed drive and deviating said electron ray horizontally over said screen with a speed proportional to the shifting speed of the ultrasonic ray in the first or second plane, switching means for momentarily connecting said first or second slow speed drives to said horizontal generator in lieu of said first or second fast speed drives, respectively, to change said system to scan in a parallel plane.

2. An instrument in accordance with claim 1, the instrument further comprising a second vertical sweep generator connected with the switched on slow speed drive for deviating said electron beam vertically over the screen with a speed proportional to the shifting speed of the ultrasonic ray from one plane to the following parallel plane, switching means adapted to replace the first-mentioned vertical sweep generator by said second vertical sweep generator, and an electronic gate device with a switch adapted to throw said device into the electrical connection between the receiver of said ultrasonic emitting and receiving system and the beam intensity control grid of said tube, said electronic gate device transmitting to the control grid only echo impulses adjusted to a specific depth range of the object being examined.

* * * * *